Nov. 10, 1942.   G. E. PENDLETON   2,301,641
SCOOP
Filed April 2, 1941   5 Sheets-Sheet 1

Inventor
GEORGE E. PENDLETON
By Clarence A. O'Brien
Attorney

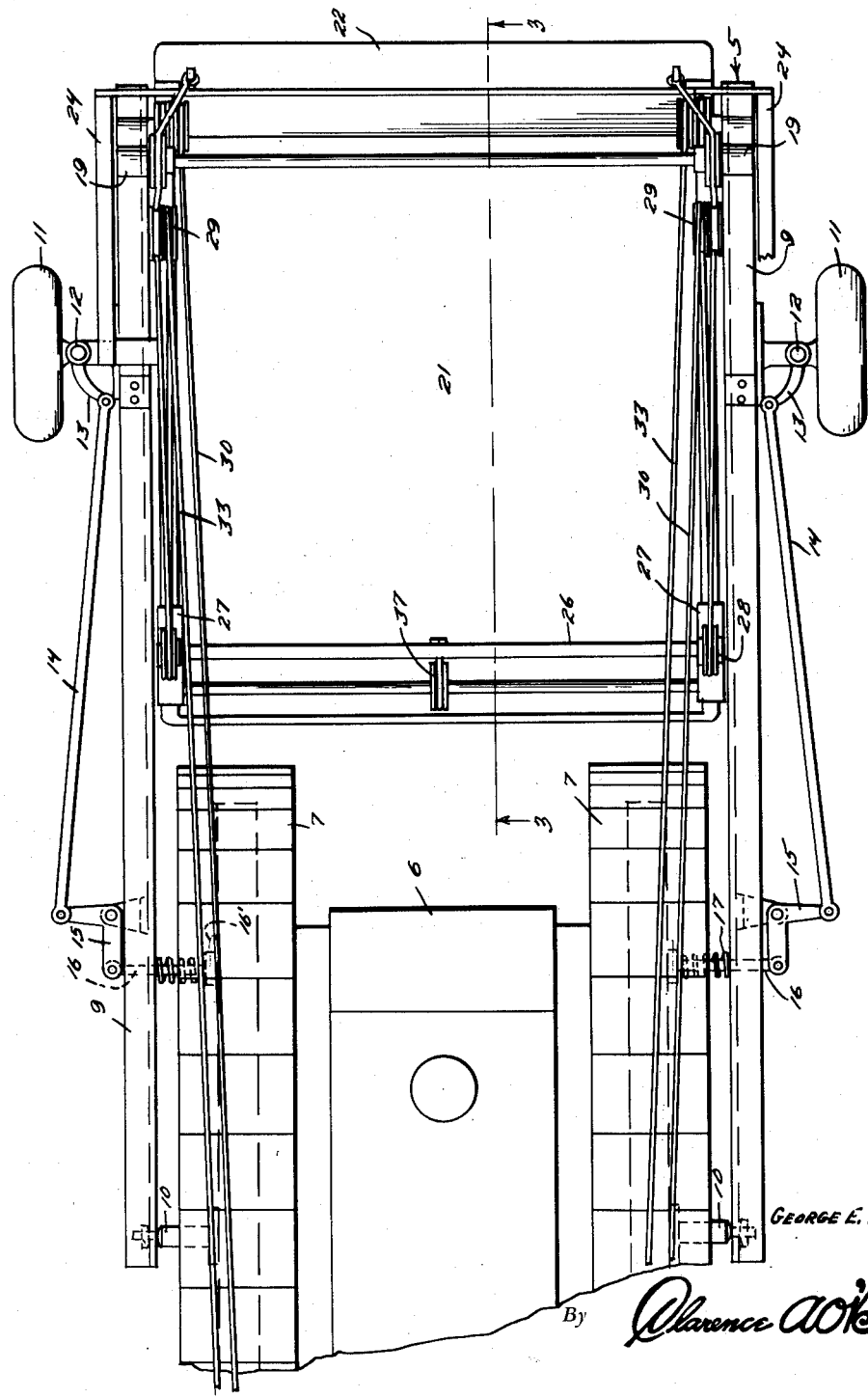

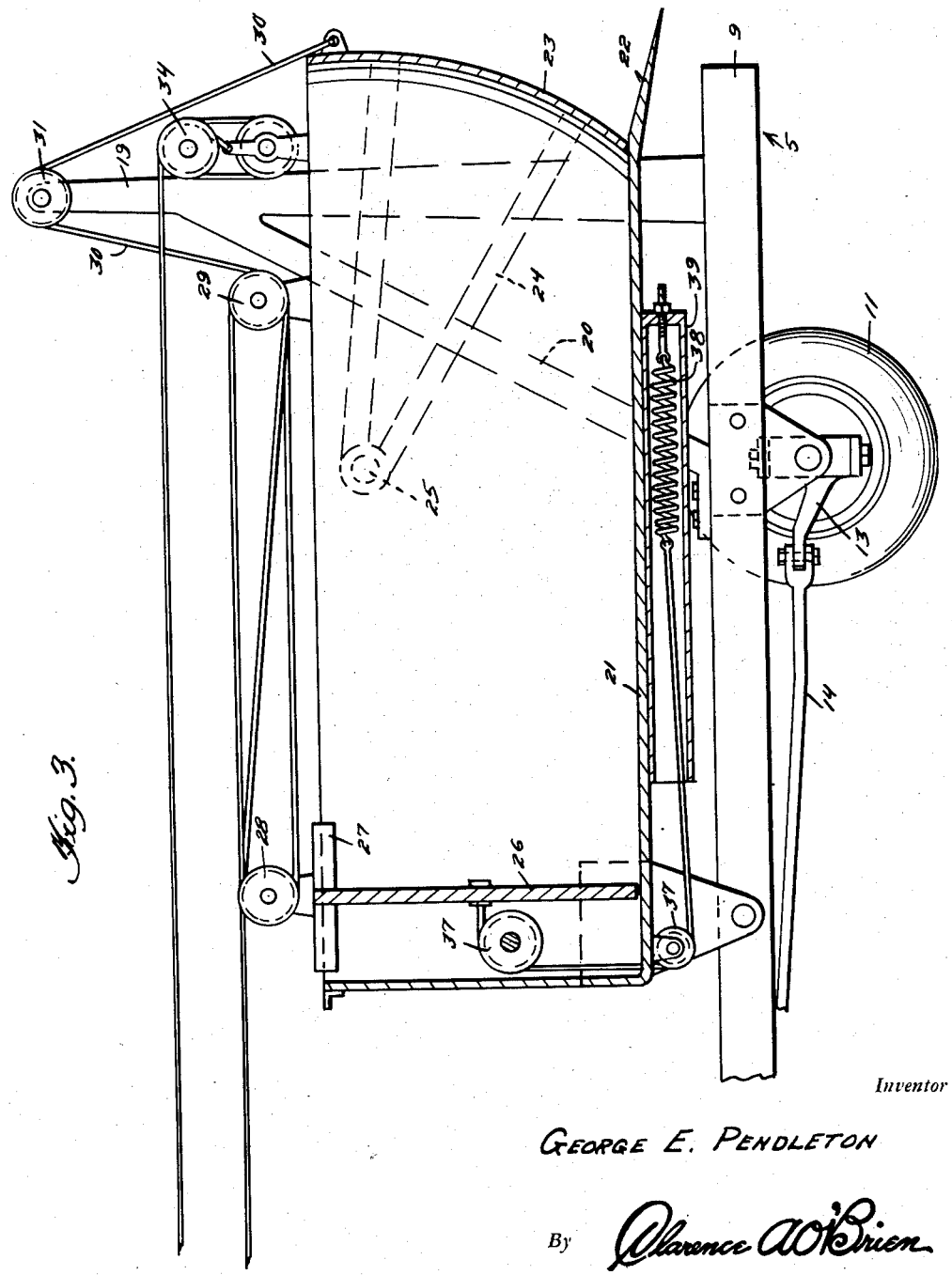

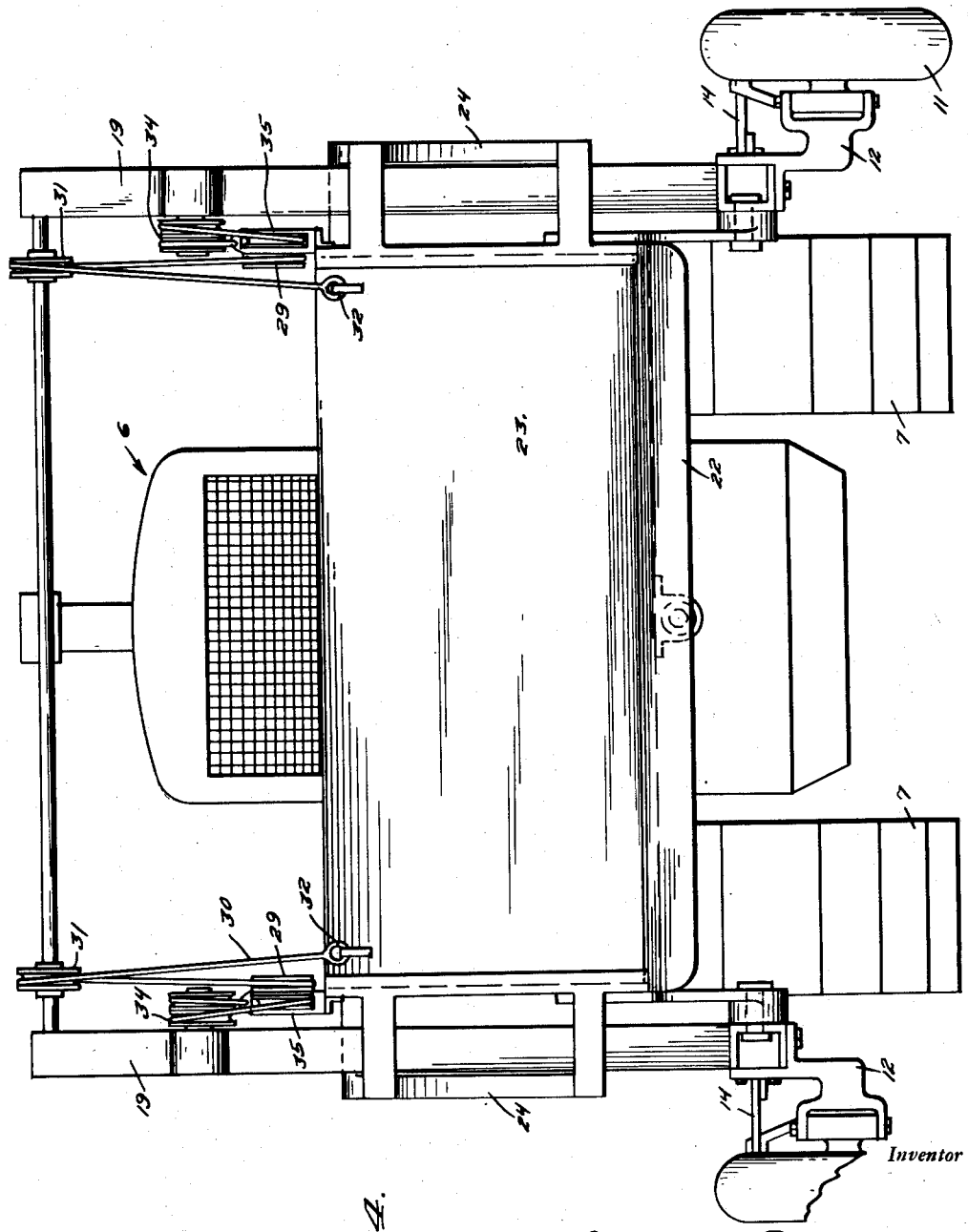

Nov. 10, 1942.　　　G. E. PENDLETON　　　2,301,641
SCOOP
Filed April 2, 1941　　　5 Sheets—Sheet 5
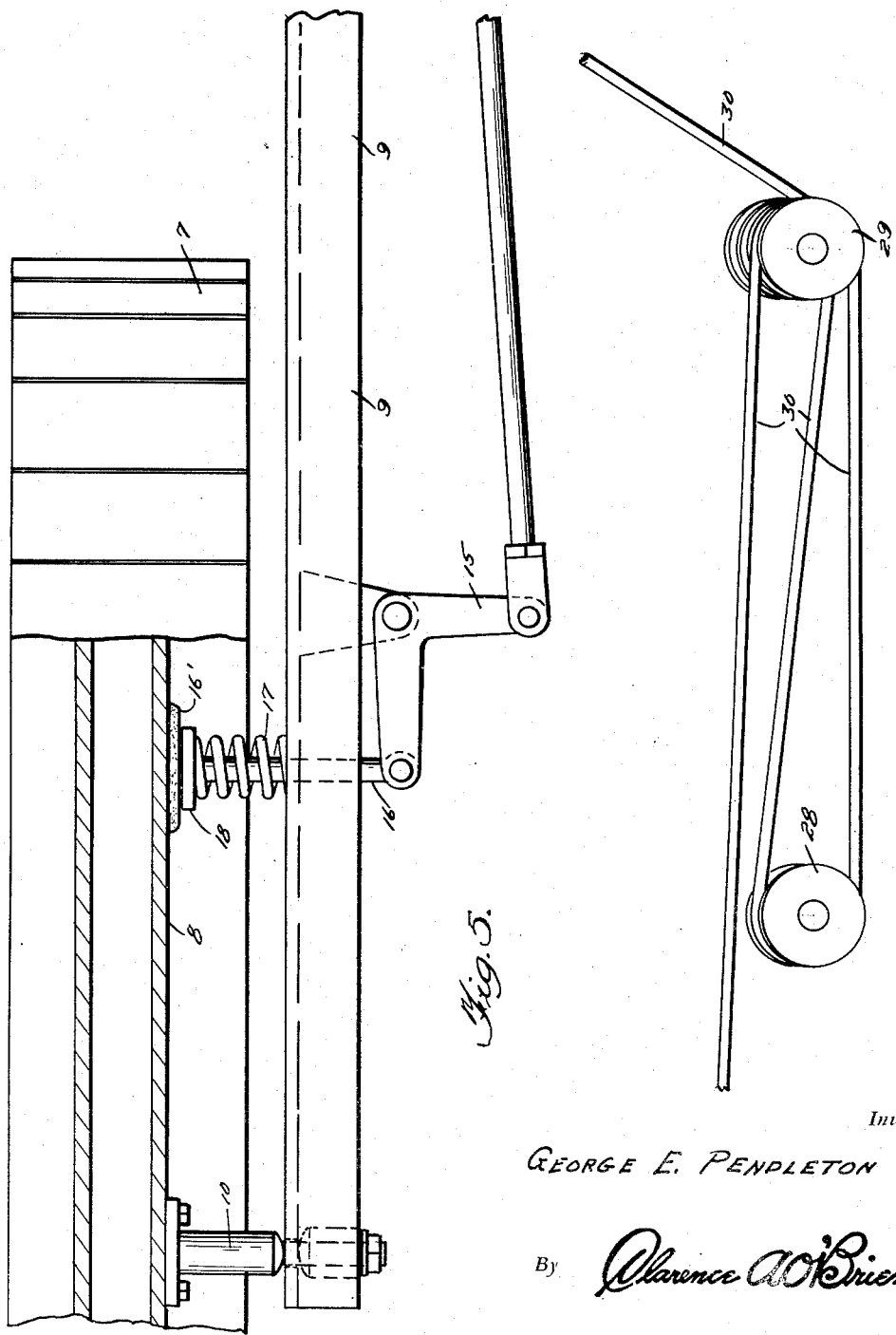
Inventor
GEORGE E. PENDLETON
By Clarence A. O'Brien
Attorney Patented Nov. 10, 1942

2,301,641

UNITED STATES PATENT OFFICE 2,301,641

SCOOP

George E. Pendleton, Cloverdale, N. Mex.

Application April 2, 1941, Serial No. 386,528

3 Claims. (Cl. 37—124)

This invention relates to a bulldozer type of scoop which may be easily and quickly installed at the front end of a tractor to be pushed thereby for loading and conveying material to a selected place, and has for the primary object the provision of a device of this character which, to a great extent, will be self-supporting and may be guided by the guiding of the tractor and has means whereby it may be unloaded from a carrying position.

With these and other objects in view as will become more apparent as the description proceeds, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a scoop constructed in accordance with my invention and showing the same applied to the forward end of a tractor.

Figure 2 is a top plan view illustrating the same.

Figure 3 is a sectional view taken on the line 3—3 of Figure 2.

Figure 4 is a front elevation illustrating the device.

Figure 5 is a fragmentary top plan view, partly in section, illustrating a portion of the steering mechanism for the carriage of the scoop actuated by the tractor.

Figure 6 is a schematic diagram of the follower operating cable reeving.

Figure 1:
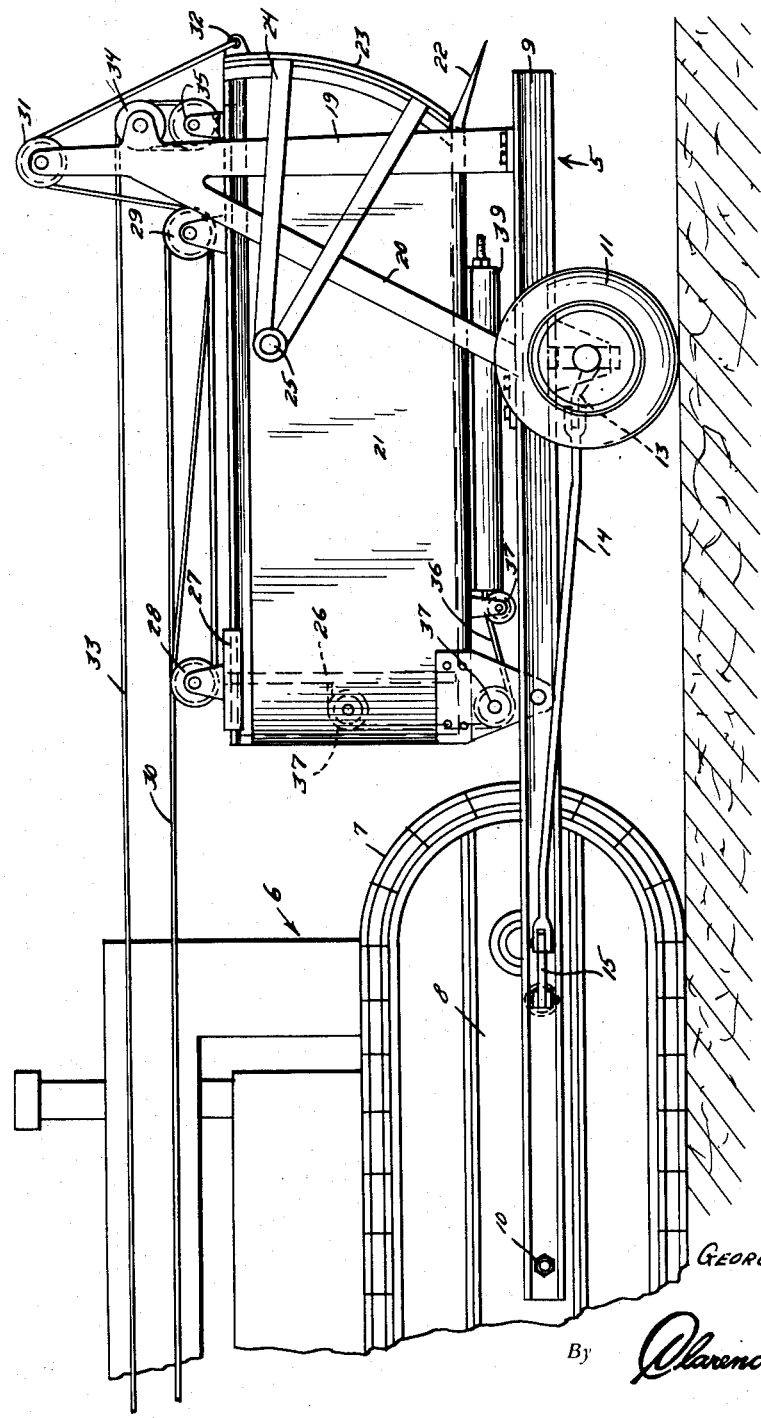

Referring in detail to the drawings, the numeral 5 indicates a carriage which may be readily coupled onto the forward end of a tractor 6. In this instance the tractor 6 is of the caterpillar type, the endless traction treads being indicated by the character 7 and the mountings therefor by the character 8. The carriage 5 includes side members 9 which extend rearwardly to opposite sides of the mountings 8 and have their rear ends loosely journaled on the mountings 8, as shown at 10, whereby the side members 9 may move upwardly and downwardly with a slight lateral movement toward and from the mountings 8 of the tractor.

The side members 9 extend well forwardly of the tractor and are supported by the latter and by ground wheels 11 in a horizontal position. The ground wheels 11 are journaled on axles 12 secured to said side members 9 slightly rearwardly of the forward ends thereof and are of the stub axle type including arms 13 to which are pivoted tie rods 14 extending rearwardly to the tractor. The rear ends of the tie rods are pivotally connected to bell crank levers 15 which are pivotally mounted on the side members 9 and have pivotally connected thereto spring influenced plungers 16 slidably mounted in the side members and terminating in close proximity to the mountings 8 of the tractor and the latter are provided with offsets or bumpers 16' to be contacted by the plungers. The springs of the plungers are indicated by the character 17 and bear against heads 18 of the plungers and the side members 9. The springs 17 act to maintain the heads 18 in riding contact with the bumpers 16'.

The customary practice of steering a tractor of the type shown in the drawings, is to operate the tractor tread 7 on the opposite side of the tractor in which the turn is to be made. For instance, if the tractor is to be turned to the right the left hand tractor tread will be set in operation while the right hand tractor tread is non-driven. On the turning of the tractor to the right as specified the mounting of the right hand tractor tread exerts pressure upon the right hand plunger causing the right hand front wheel to be cut to the right, and at the same time as the left hand tread 7 moves slightly away from the adjacent arm 9, the spring 17 of the adjacent plunger will press the plunger inwardly and thus cause the bellcrank 15 to exert a pull on the link 14 which causes the left hand front wheel to be cut to the right and thus the two front wheels being cut to the right will cause the carriage to turn to the right as the tractor is making a turn to the right. A left hand turn is simply a reverse operation, that is, the tractor tread on the right hand side is set in motion under power while the left hand tractor tread is non-driven. The wheels of the carriage will then be cut to the left, directing the carriage to the left.

Upright members 19 are secured on the side members 9 adjacent to the forward ends thereof and are reinforced by braces 20. Operable between the uprights 19 and pivotally mounted on the side members 9 rearwardly of the ground wheels 11 is a scoop or bucket 21. The forward end of the scoop or bucket is open and the bottom wall thereof at the forward end is tapered and inclined downwardly to form a scraper 22 which extends a distance beyond the sides of the scoop or bucket. The forward ends of the side walls of the bucket or scoop are arcuately curved and matching the curvature of said forward edges of the side walls is a closure or gate 23 carried by arms 24 pivotally mounted on the sides of the bucket or scoop, as shown at 25.

Operable within the body of the scoop or bucket is a follower 26 connected to slide members 27 slidably mounted on the upper edges of the side walls of the bucket or scoop and on which are journaled pulleys 28. Pulleys 29 are mounted on the side walls of the scoop or bucket slightly rearwardly of the forward edges thereof and are of the double type. Unloading cables 30 operating from a winch on the tractor are trained over the pulleys 29 and then over the pulleys 28 and back over the pulleys 29 and over pulleys 31 mounted on the upper ends of the uprights 19 with the dead ends of the cables connected to the gate 23, as shown at 32.

Raising and lowering cables 33 operating from the winch on the tractor pass over pulleys 34 journaled on the uprights and over pulleys 35 mounted on the sides of the bucket or scoop and have the dead ends thereof secured to the brackets which support the pulleys 34. The cables 33 are employed for raising and lowering the scoop or bucket and when the latter is lowered by the cables 33 the scraping edge 22 contacts the ground.

A cable 36 is connected to the follower 26 and passes over pulleys 37 and is connected to a coil spring 38 located in a housing 39 mounted on the bottom of the scoop or bucket. The coil spring 38 is adjustably connected to the housing whereby the tension thereof may be increased and decreased.

When the cables 30 are first operated by the winch, they swing the gate 23 upwardly to open the forward end of the scoop or bucket and on further movement of the cables 30 the pulleys 28 are moved toward the pulleys 29 causing the follower 26 to travel toward the forward end of the scoop or bucket for the purpose of removing material therefrom, thus permitting the unloading of the bucket or scoop to take place when the latter is in a horizontal carrying position. As the follower 26 moves forwardly it increases the tension of the spring 38 so that when the cables 30 are returned to normal position, the spring 38 acts to restore the follower 26 to the rearward end of the scoop or bucket.

It is to be understood that the gate will be kept in an open position during the time that the scoop or bucket is lowered for the purpose of loading with material by the forward motion of the device by the tractor.

In order that the gate 23 be held open the cables 30 are kept taut by the winch after the follower 26 has returned to a rearward position within the scoop or bucket.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a device of the class described, a frame having an upstanding support, a scoop open at its front end and pivoted at its rear end to the frame, a door pivoted to the scoop for closing its front end, a follower in the scoop movable toward and away from the open end, means for raising and lowering the front end of the scoop, a pulley on the support above the scoop, a pair of pulleys on the upper portion of the scoop adjacent its front edge, a pulley carried by the follower, and a cable having one end attached to the door and trained over the first-named pulley, under one of the second-named pulleys, around the third-named pulley and then extended around the other of said second-named pulleys with the other end of the cable extended rearwardly for actuation thereof, said cable initially raising the door and subsequently moving the follower forwardly, and spring-actuated means returning the follower to its original position.

2. In a device of the class described, a frame having an upstanding support, a scoop open at its front end and pivoted at its rear end to the frame, a door pivoted to the scoop for closing its front end, a follower in the scoop movable toward and away from the open end, means for raising and lowering the front end of the scoop, a pulley on the support above the scoop, a pair of pulleys on the upper portion of the scoop adjacent its front edge, a pulley carried by the follower, and a cable having one end attached to the door and trained over the first-named pulley, under one of the second-named pulleys, around the third-named pulley and again extended around the other of said second-named pulleys with the other end of the cable extended rearwardly for actuation thereof, said cable initially raising the door and subsequently moving the follower forwardly, and spring-actuated means returning the follower to its original position, said second-named pulleys being adapted to accelerate opening movement of the door upon a lowering movement of the scoop.

3. In a device of the class described, a frame having an upstanding support, a scoop open at its front end and pivoted at its rear end to the frame, a door pivoted to the scoop and gravity actuated for closing its front end, a follower in the scoop movable toward and away from the open end, means for raising and lowering the front end of the scoop, a pulley on the support above the scoop, a pair of pulleys on the upper portion of the scoop adjacent its front edge, a pulley carried by the follower, and a cable having one end attached to the door and trained over the pulleys in a manner adapted to initially raise the door and to subsequently move the follower forwardly and spring-actuated means returning the follower to its original position.

GEORGE E. PENDLETON.